(12) United States Patent
Huang

(10) Patent No.: US 7,884,803 B2
(45) Date of Patent: Feb. 8, 2011

(54) TURNTABLE-TYPE INPUT DEVICE

(75) Inventor: Jui-Yi Huang, Taoyuan (TW)

(73) Assignee: Darfon Electronics Corp., Taoyuan (TW)

( * ) Notice: Subject to any disclaimer, the term of this patent is extended or adjusted under 35 U.S.C. 154(b) by 825 days.

(21) Appl. No.: 11/830,888

(22) Filed: Jul. 31, 2007

(65) Prior Publication Data

US 2008/0174559 A1 Jul. 24, 2008

(30) Foreign Application Priority Data

Aug. 3, 2006 (TW) ................................ 95128524 A

(51) Int. Cl.
- G06F 3/02 (2006.01)
- G06F 1/16 (2006.01)
- G09G 5/00 (2006.01)
- H01H 9/26 (2006.01)
- H04M 1/00 (2006.01)

(52) U.S. Cl. ...................... 345/169; 345/156; 200/5 A; 361/679.14; 361/679.17; 361/679.56; 455/575.1; 455/575.4

(58) Field of Classification Search ......... 345/156–172; 341/20–35; 361/679.02, 679.14, 679.17, 361/679.56; 455/575.1, 575.4

See application file for complete search history.

(56) References Cited

U.S. PATENT DOCUMENTS

| | | | | |
|---|---|---|---|---|
| 5,454,652 A | * | 10/1995 | Huellemeier et al. | 400/489 |
| 5,574,481 A | * | 11/1996 | Lee | 345/168 |
| 6,794,588 B2 | * | 9/2004 | Lin | 200/5 A |
| 6,950,038 B2 | | 9/2005 | Hsu | |
| 2003/0122690 A1 | * | 7/2003 | Hsu | 341/22 |
| 2005/0054393 A1 | * | 3/2005 | Fagerstrom et al. | 455/575.1 |
| 2006/0046797 A1 | * | 3/2006 | Chen | 455/575.4 |
| 2006/0064712 A1 | * | 3/2006 | Kim | 720/710 |

* cited by examiner

Primary Examiner—Bipin Shalwala
Assistant Examiner—Sosina Abebe
(74) Attorney, Agent, or Firm—Thomas, Kayden, Horstemeyer & Risley

(57) ABSTRACT

A turntable-type input device includes a base, a first keyboard, a second keyboard and a turntable. The first keyboard and second keyboard are movably disposed on the base. The turntable is rotatably disposed on the base and located above the first keyboard and the second keyboard. The turntable is coupled to the first keyboard and the second keyboard. When the turntable is rotated, the turntable brings the first keyboard and the second keyboard synchronously to move in opposite directions relative to the base such that the first keyboard and the second keyboard are spread out from the base or received to the base.

19 Claims, 5 Drawing Sheets

TURNTABLE-TYPE INPUT DEVICE

This application claims the benefit of Taiwan application Serial No. 95128524, filed Aug. 3, 2006, the subject matter of which is incorporated herein by reference.

BACKGROUND OF THE INVENTION

1. Field of the Invention

The invention relates in general to a turntable-type input device, and more particularly to a turntable-type input device whose keyboards can be spread out or received.

2. Description of the Related Art

The keypad of a portable electronic device, such as a personal digital assistant (PDA) or smart phone is usually not big due to volume limitation of the electronic device, which is not as convenient for the user to operate as a normal computer keyboard. When the user is to execute a relatively more complicated program or uses the portable electronic device as a small computer or handheld computer, he/she usually chooses to connect the portable electronic device to another input device, such as a portable keyboard so as to perform the inputting operation conveniently.

However, the portable electronic device is usually separated from the portable keyboard in usage. The user, as holding the portable keyboard by two hands, cannot operate the keypad of the portable electronic device at the same time, which results in great inconvenience. Besides, because the portable keyboard is very similar to the normal computer keyboard, the portable keyboard usually has large volume and weight, which is not convenient for the user to carry.

SUMMARY OF THE INVENTION

The invention is directed to a turntable-type input device. The user can fix the portable electronic device on a turntable of the turntable-type input device. By rotating the portable electronic device, two keyboards of the turntable-type input device can be brought to move and spread out. When the user is operating the turntable-type input device, he/she can also operate the keys on the portable electronic device at the same time. When the operation is finished, it needs only to rotate the turntable again to receive the two keyboards into a base of the turntable-type input device, which is very convenient in operation. The turntable-type input device needs only a small space for receiving the keyboards and can be carried conveniently, it has high adaptability and elasticity According to the present invention, a turntable-type input device is provided. The turntable-type input device includes a base, a first keyboard, a second keyboard and a turntable. The first keyboard and second keyboard are movably disposed on the base. The turntable is rotatably disposed on the base and located above the first keyboard and the second keyboard. The turntable is coupled to the first keyboard and the second keyboard. When the turntable is rotated, the turntable brings the first keyboard and the second keyboard synchronously to move in opposite directions relative to the base such that the first keyboard and the second keyboard are spread out from the base or received to the base.

The invention will become apparent from the following detailed description of the preferred but non-limiting embodiments. The following description is made with reference to the accompanying drawings.

DETAILED DESCRIPTION OF THE INVENTION

Figure 1A:
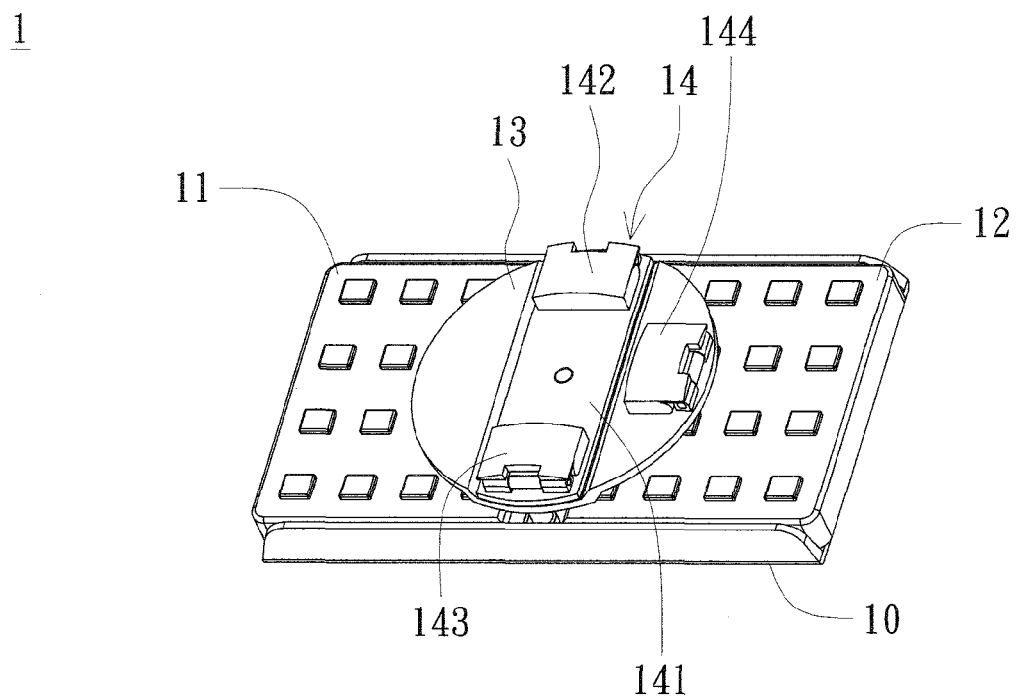
FIG. 1A is a schematic diagram of a turntable-type input device whose keyboards are received according to a preferred embodiment of the invention.
Figure 1B:
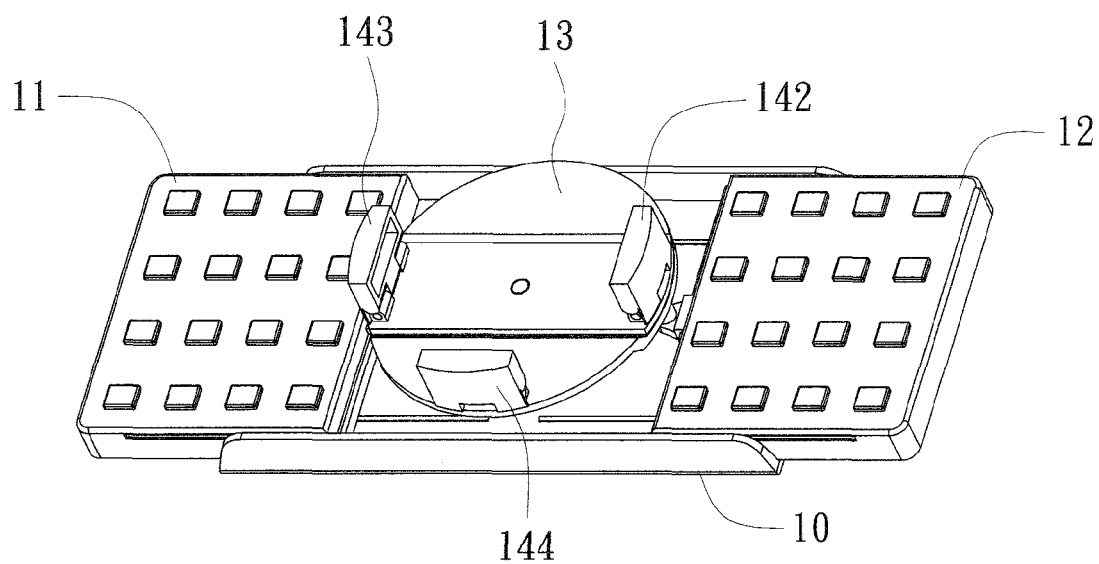
FIG. 1B is a schematic diagram of the turntable-type input device of FIG. 1A whose keyboards are spread out.

Referring to FIGS. 1A and 1B, FIG. 1A is a schematic diagram of a turntable-type input device whose keyboards are received according to a preferred embodiment of the invention, and FIG. 1B is a schematic diagram of the turntable-type input device of FIG. 1A whose keyboards are spread out. As shown in FIG. 1A, a turntable-type input device 1 includes a base 10, a first keyboard 11, a second keyboard 12 and a turntable 13. The first keyboard 11 and the second keyboard 12 are movably disposed on the base 10, and the turntable 13 is rotatably disposed on the base 10. The turntable 13 is located above the first keyboard 11 and the second keyboard 12 and is also coupled to the first keyboard 11 and the second keyboard 12. When the turntable 13 is rotated, the turntable 13 synchronously brings the first keyboard 11 and the second keyboard 12 to move on the base 10 in opposite directions and accordingly spread out from the base 10 (as shown in FIG. 1B) or to be received into the base 10 (as shown in FIG. 1A).

The turntable-type input device 1 further includes a clipping unit 14 disposed on the turntable 13 for fixing a portable electronic device (not shown in the figure). The clipping unit 14 mainly includes a clipping body 141 and three clipping sheets 142, 143 and 144. The clipping body 141 is disposed on the turntable 13, while the three clipping sheets 142, 143 and 144 are respectively disposed at two sides of the clipping body 141 and on the turntable 13 and can be opened or closed relative to the clipping body 141 and the turntable 13. When the keyboards 11 and 12 are received in the base 10 of the turntable-type input device 1 (as shown in FIG. 1A), the three clipping sheets 142, 143 and 144 can be attached flatly to the turntable 13. When the keyboards 11 and 12 are spread out of the turntable-type input device 1 (as shown in FIG. 1B), the three clipping sheets 142, 143 and 144 can be rotated to stand up on the turntable 13 to fix the portable electronic device (not shown in the figure).

Figure 2:
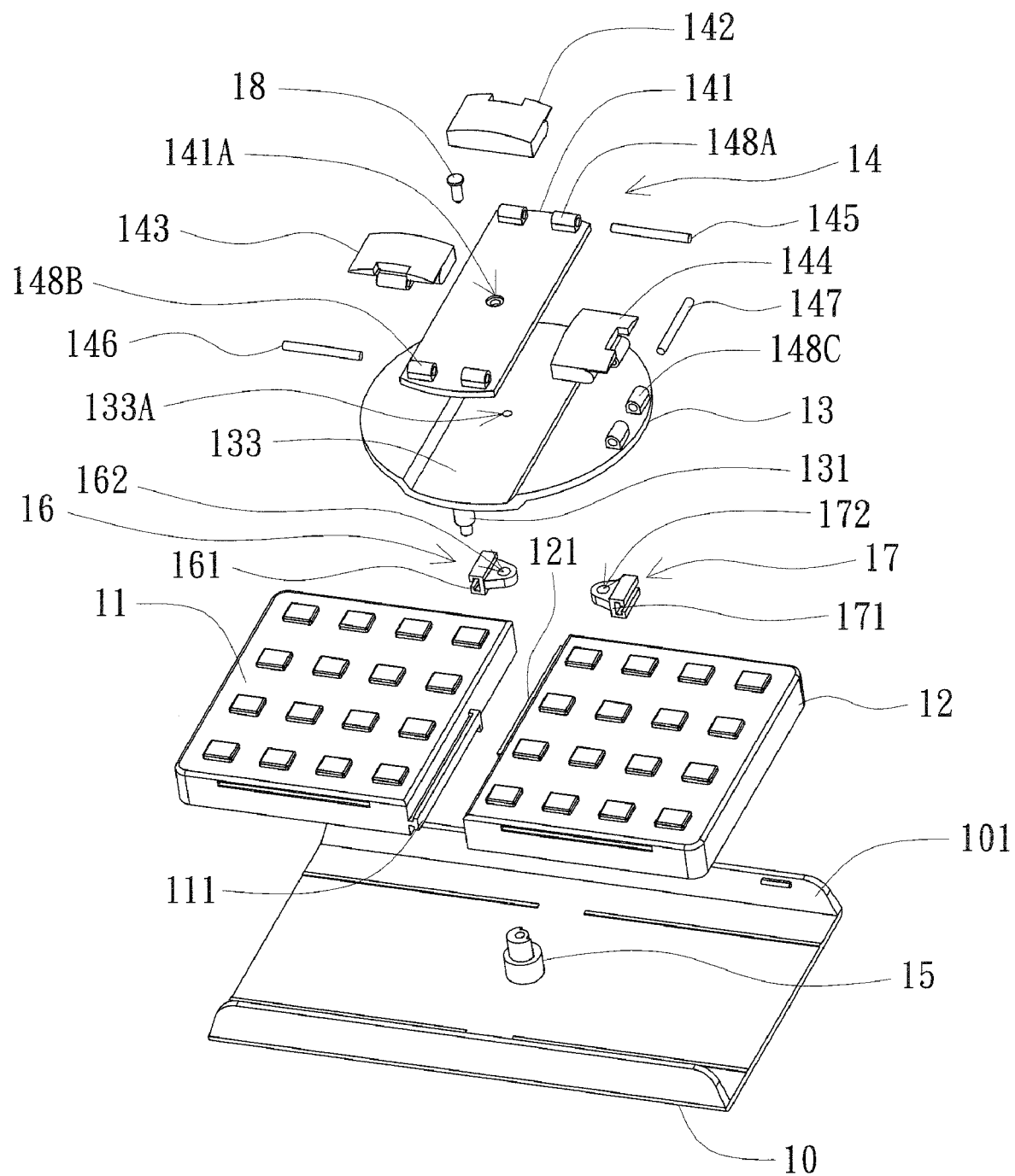
FIG. 2 is an exploded view of the turntable-input device of FIG. 1A.

The connections between the components of the turntable-type input device 1 will be described in details accompanied with drawings as follows. Referring to FIG. 2, an exploded view of the turntable-input device of FIG. 1A is shown. As shown in FIG. 2, the base 10 has a guiding groove 101, and the first keyboard 11 and the second keyboard 12 are disposed in the guiding groove 101. The guiding groove 101 is for providing the moving path of the first keyboard 11 and the second keyboard 12. The first keyboard 11 has a first guiding rail 111, and the second keyboard 12 has a second guiding rail 121. The second guiding rail 121 is substantially parallel to the first guiding rail 111. The direction of the first guiding rail 111 and the second guiding rail 121 is substantially vertical to the moving directions of the first keyboard 11 and the second keyboard 12. The turntable 13 has a first axial piece 131 and a second axial piece 132 (shown in FIG. 4C) disposed at a lower surface of the turntable 13. The first axial piece 131 and the second axial piece 132 are preferably separated from each other by a radius angle of 180 degrees relative to the turntable 13.

Preferably, the length of the first guiding rail 111 and the second guiding rail 121 is smaller than the width of the first keyboard 11 or the second keyboard 12 so as to limit the rotating angle of the turntable 13. Preferably, the rotating angle of the turntable 13 is not larger than 90 degrees.

The turntable-type input device 1 further includes a pivot 15, a first slide piece 16, a second slide piece 17 and a combination piece 18. The pivot 15 is disposed on the base 10 and located between the first keyboard 11 and the second keyboard 12. The pivot 15 is for connecting the turntable 13 and the base 10 such that the turntable 13 can rotate relative to the base 10 via the pivot 15. The first slide piece 16 is coupled to the turntable 13 and the first keyboard 11, and the second slide piece 17 is coupled to the turntable 13 and the second keyboard 12. The first slide piece 16 has a first guiding slot 161 and a first axial hole 162, and the second slide piece 17 has a second guiding slot 171 and a second axial hole 172. The first guiding slot 161 and the second guiding slot 171 are respectively coupled to the first guiding rail 111 and the second guiding rail 121. The first axial hole 162 and the second axial hole 172 are respectively coupled to the first axial piece 131 and the second axial piece 132.

Preferably, the upper surface of the turntable 13 has a socket 133 and a though hole 133A. The clipping body 141 has another though hole 141A. The clipping body 141 is inserted into the socket 133, locked in the though holes 141A and 133A via the combination piece 18, such as a screw, and accordingly fixed to the turntable 13. The three clipping sheets 142, 143 and 144 are pivotally connected to three shaft sleeves 148A, 148B and 148C at two sides of the clipping body 141 and on the turntable 13 via three shafts 145, 146 and 147, respectively. In this way, when the turntable-type input device 1 is under a keyboard-receiving state (the keyboards 11 and 12 are received in the base 10), the three clipping sheets 142, 143 and 144 can be attached flatly on the turntable 13 to occupy no receiving space. When a portable electronic device is to be disposed on the turntable-type input device 1, the three clipping sheets 142, 143 and 144 are lifted up to fix the portable electronic device.

Figure 3A:
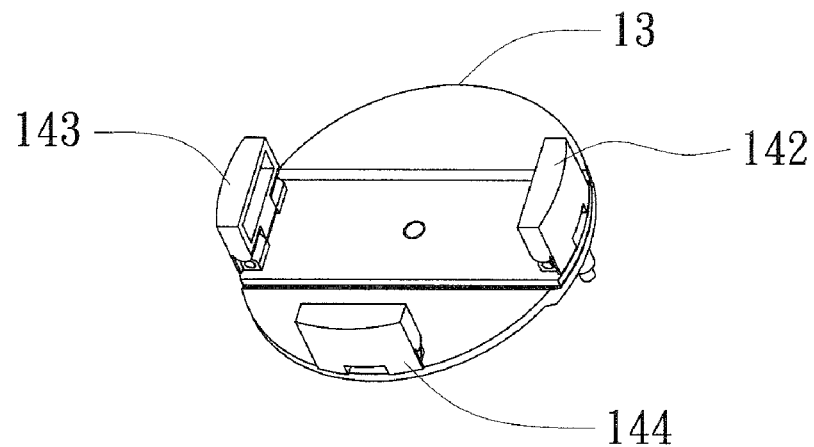
FIG. 3A is a schematic diagram of the combination of the turntable and the clipping unit in FIG. 2.
Figure 3B:
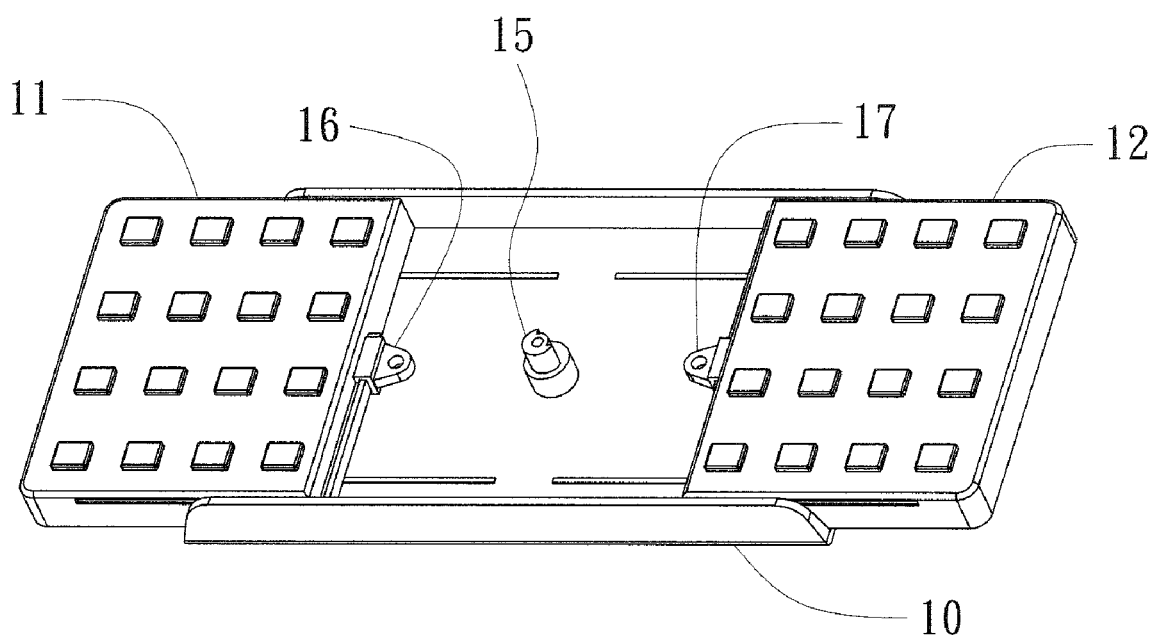
FIG. 3B is a schematic diagram of the combination of the base, the first keyboard and the second keyboard in FIG. 2.

Some details about component fabrication will be described as follows. Referring to FIGS. 3A and 3B, FIG. 3A is a schematic diagram of the combination of the turntable and the clipping unit in FIG. 2, and FIG. 3B is a schematic diagram of the combination of the base, the first keyboard and the second keyboard in FIG. 2. To fabricate the turntable-type input device 1, the clipping unit 14 can be assembled to the turntable 13 first. The clipping sheets 142 and 143 are assembled to the clipping body 141 via the shafts 145 and 146 respectively and then the clipping body 141 and the clipping sheet 144 are assembled to the turntable 13.

Before the turntable 13 is disposed on the base 10, the first slide piece 16 and the second slide piece 17 can be respectively inserted into the first guiding rail 111 and the second guiding rail 121 via the first guiding slot 161 and the second guiding slot 171. By doing this, the first slide piece 16 and the second slide piece 17 can slide in the first guiding rail 111 and the second guiding rail 121, respectively. Following that, the first keyboard 11 and the second keyboard 12 are sequentially disposed in the guiding groove 101 of the base 10. As shown in FIG. 3B, the first keyboard 11 and the second keyboard 12 can slide in/out at two sides of the base 10. The sliding directions of the first slide piece 16 and the second slide piece 17 is substantially vertical to the moving directions of the first keyboard 11 and the second keyboard 12.

Afterward, the turntable 13 is disposed on the base 10 via the combination piece 18 (as shown in FIG. 2). In the fabrication, the first keyboard 11 and the second keyboard 12 can be slid and separated from each other by a distance. Then, the first axial piece 131 and the second axial piece 132 (shown in FIG. 4C) of the turntable 13 are inserted into the first axial hole 162 of the first slide piece 16 and the second axial hole 172 of the second slide piece 17, respectively. Next, the combination piece 18 is sequentially locked in the though holes 141A and 133A to combine the clipping body 141 and the turntable 15 with the pivot 15 and pivotally connect the turntable 13 on the base 10. Until this stage, the fabrication of the turntable-type input device 1 is approximately completed.

Figure 4A:
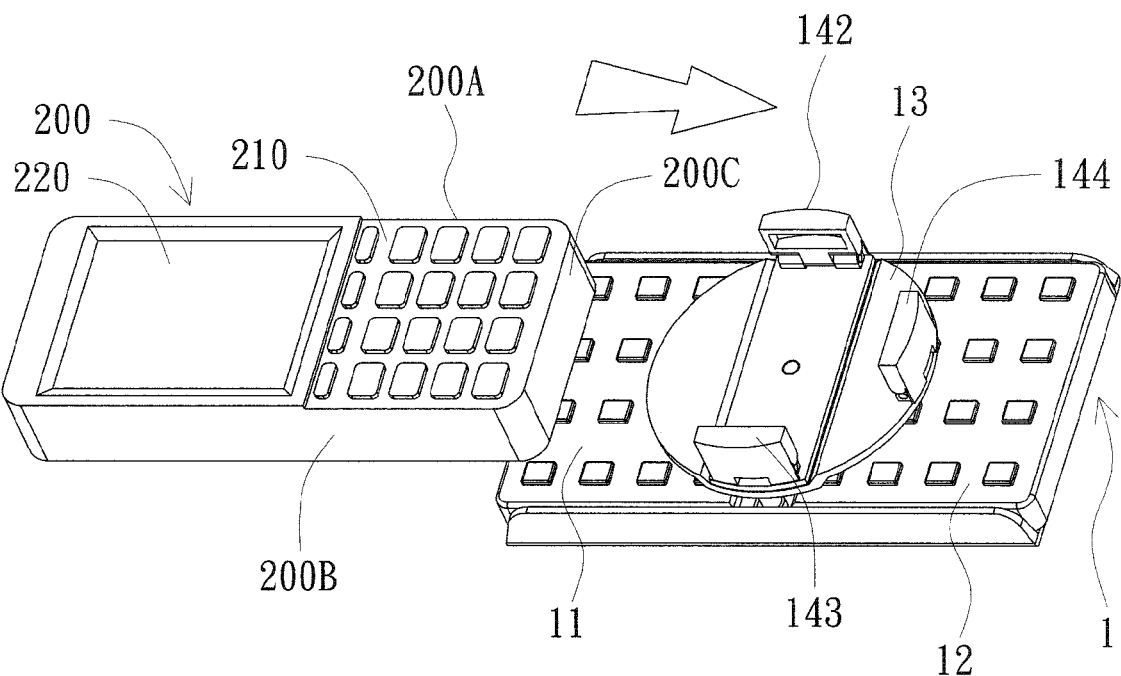
FIGS. 4A~4D are schematic diagrams of continuous operations of the turntable-type input device and portable electronic device of FIG. 1A.

The operation of the turntable-type input device 1 will be illustrated accompanied with drawings as follows. Referring to FIGS. 4A~4D, schematic diagrams of continuous operations of the turntable-type input device and portable electronic device of FIG. 1A are shown. As shown in FIG. 4A, a portable electronic device 200 has a small keyboard 210 and a screen 220. When the user is to insert the portable electronic device 200 to the turntable-type input device 1 for usage, he/she can place the part of the portable electronic device 200 having the small keyboard 210 into the clipping unit 14. The positions of the three clipping sheets 142, 143 and 144 are preferably designed to be able to respectively clamp the two sides 200A and 200B and bottom 200C of the portable electronic device 200. The two sides 200A and 200B are substantially vertical to the bottom 200C.

The printed circuit board (not shown in the figure) of the first keyboard 11 is electrically coupled to the printed circuit board (not shown in the figure) of the second keyboard 12 via a flexible circuit board (not shown in the figure). The portable electronic device 200 can communicate with the turntable-type input device 1 via a bluetooth or radio-frequency (RF) wireless communication module, or a signal line.

Figure 4B:
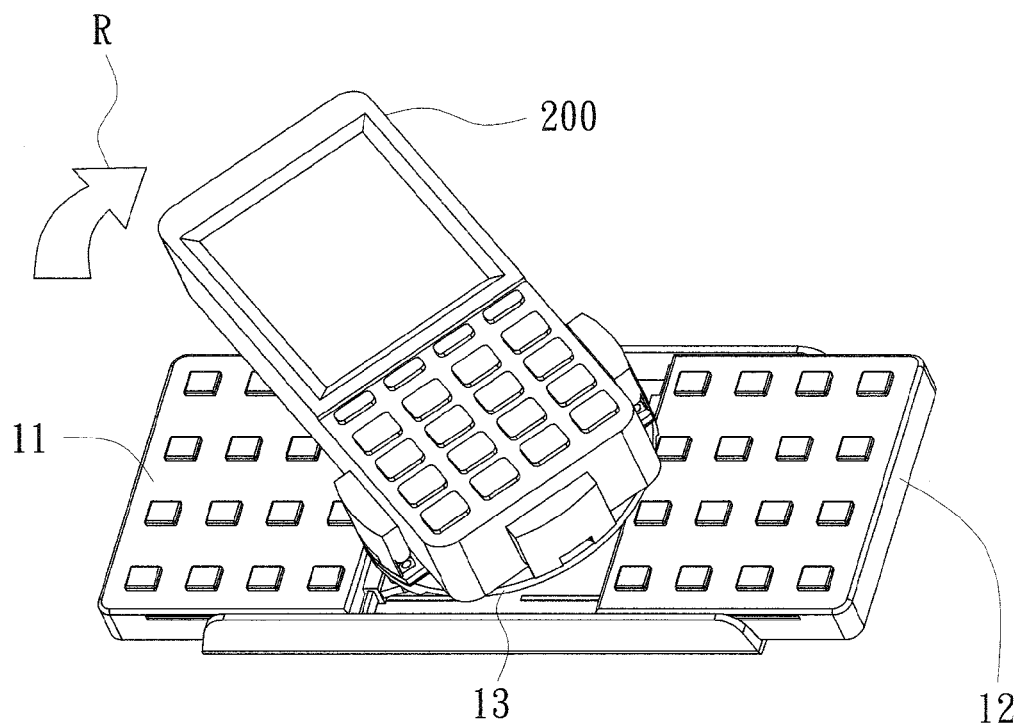
Figure 4C:
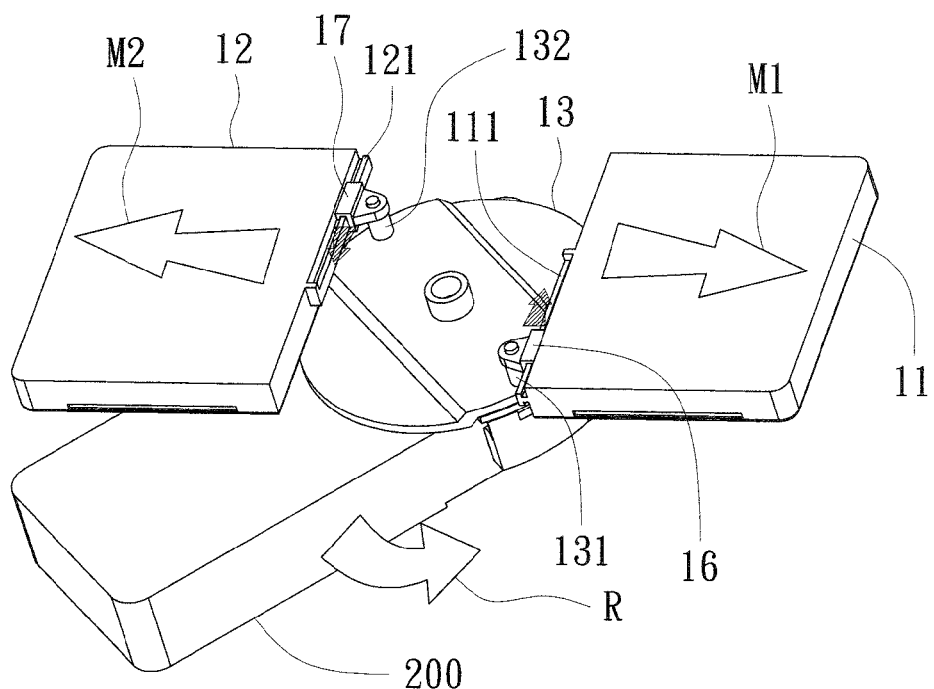

After the portable electronic device 200 is disposed on the turntable-type input device 1 as shown in FIGS. 4B~4C, FIG. 4C is a schematic rear view of the turntable-type input device 1 and the portable electronic device 200 in FIG. 4B. The user can apply a force to the portable electronic device 200 or the turntable 13 so that the turntable 13 rotates in a rotating direction R. When the portable electronic device 200 and the turntable 13 rotate in the rotating direction R, the turntable 13 pushes the first slide piece 16 and the second slide piece 17 toward two opposite sides via the first axial piece 131 and the second axial piece 132. At the time, the first slide piece 16 and the second slide piece 17 respectively slide along the first guiding rail 111 and the second guiding rail 121 to push the first keyboard 11 and the second keyboard 12 away from each other. The first keyboard 11 and the second keyboard 12 will then move out from the base 10 in two opposite moving directions M1 and M2 due to the guidance and confinement of the base 10 (not shown in FIG. 4C).

In other embodiments, racks and gear wheels can also be used for the first keyboard 11 and the second keyboard 12 to automatically slide in or out the base 10. This design is to dispose a gear wheel at the lower surface of the turntable 13 and two racks respectively on the first keyboard 11 and the second keyboard 12. The racks are respectively disposed on the first keyboard 11 and the second keyboard 12 in opposite alignment and engaged with the gearwheel of the turntable 13. When the turntable 13 is rotated, the gear wheel drives the two racks to move in opposite directions such that the first keyboard 11 and the second keyboard 12 can automatically slide out or in the base 10.

Figure 4D:
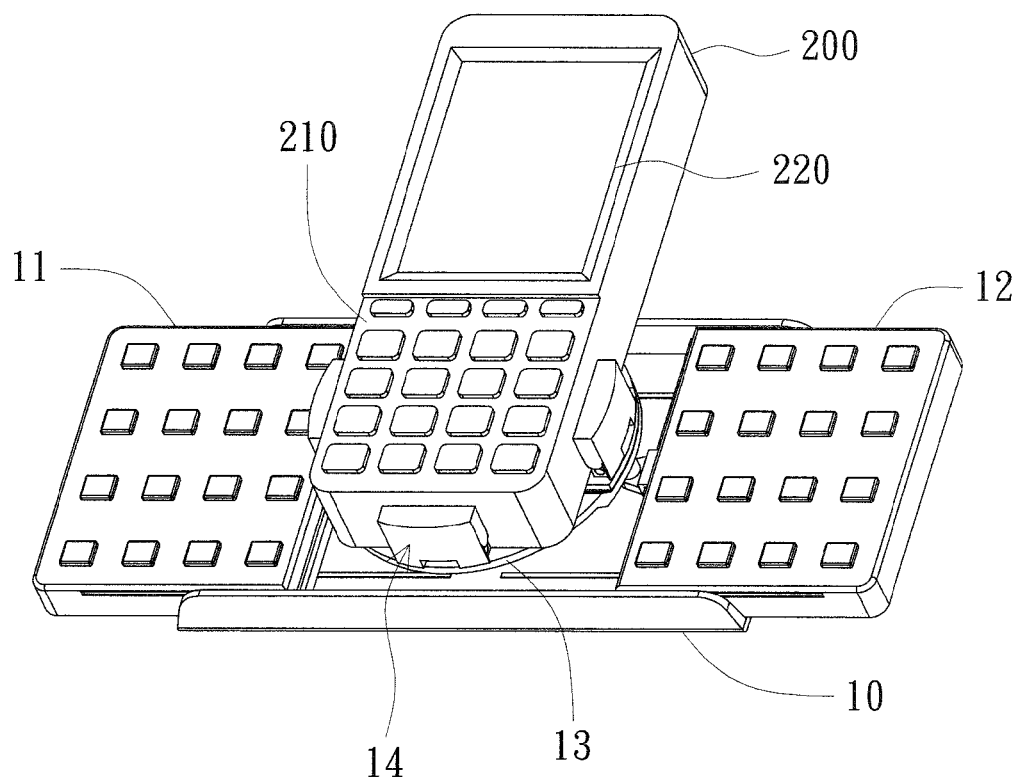

After the portable electronic device 200 that is fixed on the clipping unit 14 of the turntable 13 rotates by 90 degrees, as shown in FIG. 4D, the first keyboard 11 and the second keyboard 12 has completely spread out from the base 10. The small keyboard 210 is between the first keyboard 11 and the second keyboard 12. The screen 220 is located at a position above the small keyboard 210. The user can simultaneously operate the first keyboard 11, the second keyboard 12 and the small keyboard 210. The user can operate the first keyboard 11 and the second keyboard 12 respectively by his/her two hands just as operating a normal computer keyboard to perform inputting operations of typewriting and item-selection. Besides, the user can also hold the first keyboard 11 and the second keyboard 12 by his/her two hands just like operating a handheld remoter, and press keys by two thumbs. Although the portable electronic device is exemplified to lay down on the turntable for illustration in the embodiment, the portable electronic device can also stand straight or inclined on the turntable 13.

The turntable-type input device disclosed by the above embodiment of the invention has a base, a turntable, a first keyboard and a second keyboard. The portable electronic device is fixed on the turntable. By rotating the portable electronic device or the turntable, the first keyboard and the second keyboard can be brought to spread out from the base or be received into the base. When the user operates the turntable-type input device, he/she can conveniently operate the keys on the portable electronic device. When the user finishes operating or would like to carry the turntable-type input device, it needs only to rotate the turntable to receive the first keyboard and the second keyboard into the base. The turntable-type input device can be operated easily and effectively reduce its volume in the keyboard-receiving state. Therefore, the turntable-type input device can be carried conveniently by the user, and also has high product competitiveness in market.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A turntable-type input device, comprising:
a base;
a first keyboard and a second keyboard, movably disposed on the base; and
a turntable, rotatably disposed on the base and located above the first keyboard and the second keyboard, wherein the turntable is coupled to the first keyboard and the second keyboard;
a first slide piece, coupled to the turntable and the first keyboard; and a second slide piece, coupled to the turntable and the second keyboard; the turntable brings the first keyboard and the second keyboard synchronously to move in opposite directions relative to the base and the first slide piece slides along a first direction and the second slide piece slides along a second direction opposite to the first direction;
wherein when the turntable is rotated, the turntable brings the first keyboard and the second keyboard synchronously to move in opposite directions relative to the base such that the first keyboard and the second keyboard are spread out from the base or received to the base.

2. The turntable-type input device according to claim 1, wherein when the turntable rotates in a rotating direction, the turntable brings the first keyboard and the second keyboard to partially move out from the base in opposite directions; and
when the turntable rotates reverse to the rotating direction, the turntable brings the first keyboard and the second keyboard to move into the base in opposite directions such that the turntable partially covers the first keyboard and the second keyboard.

3. The turntable-type input device according to claim 1, wherein the turntable has a rotating angle, and the rotating angle is substantially equal to or smaller than 90 degrees.

4. The turntable-type input device according to claim 1, wherein the base has a guiding groove, the first keyboard and the second keyboard are disposed in the guiding groove and the guiding groove is for providing moving path of the first keyboard and the second keyboard.

5. The turntable-type input device according to claim 1, further comprising:
a pivot, disposed on the base and located between the first keyboard and the second keyboard, wherein the pivot is connected to the turntable and the base such that the turntable can rotate relative to the base via the pivot.

6. The turntable-type input device according to claim 1, further comprising:
a first slide piece, coupled to the turntable and the first keyboard; and
a second slide piece, coupled to the turntable and the second keyboard.

7. The turntable-type input device according to claim 6, wherein each of the first slide piece and the second slide piece has a guiding slot and an axial hole.

8. The turntable-type input device according to claim 6, wherein the first keyboard has a first guiding rail, the second keyboard has a second guiding rail, the first guiding rail is substantially parallel to the second guiding rail, and the first guiding rail and the second guiding rail are respectively coupled to the first slide piece and the second slide piece.

9. The turntable-type input device according to claim 8, wherein the direction of the first guiding rail and the second guiding rail is substantially vertical to moving directions of the first keyboard and the second keyboard.

10. The turntable-type input device according to claim 6, wherein the turntable has a first axial piece and a second axial piece disposed at a lower surface of the turntable for coupling with the first slide piece and the second slide piece, respectively.

11. The turntable-type input device according to claim 1, further comprising:
a clipping unit, disposed on the turntable for fixing a portable electronic device.

12. The turntable-type input device according to claim 11, wherein the clipping unit has a clipping body and three clipping sheets, the clipping body is disposed on the turntable and the three clipping sheets are respectively disposed at two sides of the clipping body and on the turntable, and can be respectively opened or closed relative to the clipping body and the turntable.

13. The turntable-type input device according to claim 12, wherein the turntable has a socket and the clipping body is inserted in the socket.

14. The turntable-type input device according to claim 12, wherein the three clipping sheets are pivotally connected to the two sides of the clipping body and the turntable, respectively.

15. The turntable-type input device according to claim 12, wherein the three clipping sheets can respectively clip two sides and a bottom of the portable electronic device and the two sides are vertical to the bottom.

16. A turntable-type input device, comprising:
a base;
a first keyboard and a second keyboard, movably disposed on the base;
a turntable, rotatably disposed on the base and located above the first keyboard and the second keyboard, wherein the turntable is coupled to the first keyboard and the second keyboard;
a first slide piece, coupled to the turntable and the first keyboard; and
a second slide piece, coupled to the turntable and the second keyboard;
wherein when the turntable is rotated, the first slide piece slides along a first direction and the second slide piece slides along a second direction opposite to the first direction and the turntable brings the first keyboard and the second keyboard synchronously to move in opposite directions substantially vertical to the first direction and the second direction, such that the first keyboard and the second keyboard are spread out from the base or received to the base.

17. The turntable-type input device according to claim 16, wherein each of the first slide piece and the second slide piece has a guiding slot and an axial hole.

18. The turntable-type input device according to claim 16, wherein the first keyboard has a first guiding rail, the second keyboard has a second guiding rail, the first guiding rail is substantially parallel to the second guiding rail, and the first guiding rail and the second guiding rail are respectively coupled to the first slide piece and the second slide piece.

19. The turntable-type input device according to claim 16, wherein the turntable has a first axial piece and a second axial piece disposed at a lower surface of the turntable for coupling with the first slide piece and the second slide piece, respectively.

\* \* \* \* \*